US00RE36083E

United States Patent [19]

Spiegel et al.

[11] E Patent Number: Re. 36,083

[45] Reissued Date of Patent: Feb. 9, 1999

[54] INKING UNIT FOR PRINTING PRESSES

[75] Inventors: Nikolaus Spiegel, Walldorf; Harald Bucher, Eschelbronn; Norbert Freyer, Sandhausen; Gerhard Fischer, Sinsheim, all of Germany

[73] Assignee: Heidelberger Druckmaschinen AG, Heidelberg, Germany

[21] Appl. No.: 761,070

[22] Filed: Dec. 5, 1996

Related U.S. Patent Documents

Reissue of:

[64] Patent No.: 5,370,046
Issued: Dec. 6, 1994
Appl. No.: 121,602
Filed: Sep. 14, 1993

[30] Foreign Application Priority Data

Sep. 22, 1992 [DE] Germany ..... 4231666
Apr. 16, 1993 [DE] Germany ..... 4312459

[51] Int. Cl.[6] ..... B41F 7/26; B41F 31/00

[52] U.S. Cl. ..... 101/148; 101/350.1; 101/487

[58] Field of Search ..... 101/147, 148, 101/487, 488, 216, 350.1, 350.2, 416.1, 347, 364, 363, 349.1

[56] References Cited

U.S. PATENT DOCUMENTS

| | | | |
|---|---|---|---|
| 2,821,133 | 1/1958 | Brodie et al. . | |
| 3,741,115 | 6/1973 | Keller . | |
| 4,176,162 | 11/1979 | Stern | 101/416.1 X |
| 4,183,298 | 1/1980 | Carpel et al. | 101/348 |
| 4,892,035 | 1/1990 | Terzuolo | 101/147 |

FOREIGN PATENT DOCUMENTS

| | | |
|---|---|---|
| 1498490 | 9/1969 | Germany . |
| 1953590 | 6/1971 | Germany . |
| 2759351 | 1/1979 | Germany . |
| 225752 | 8/1985 | Germany . |
| 9007102 | 9/1991 | Germany . |
| 3101938 | 4/1991 | Japan . |
| 3101940 | 4/1991 | Japan . |
| 3101941 | 4/1991 | Japan . |

*Primary Examiner*—J. Reed Fisher
*Attorney, Agent, or Firm*—Nils H. Ljungman and Associates

[57] ABSTRACT

An inking unit for printing presses, preferably offset printing presses, can have a plurality of plate-inking rollers for inking a plate cylinder along with a multiplicity of inking rollers. The inking rollers can be positioned to supply ink flow, in at least two directions to the plate-inking rollers. The inking rollers and the plate-inking rollers can then form a closed chain of rollers, and can enclose a space therebetween. A measuring device can be provided to monitor the temperature of the air within this space, with measured values being used for control of the temperature of the inking unit.

27 Claims, 2 Drawing Sheets

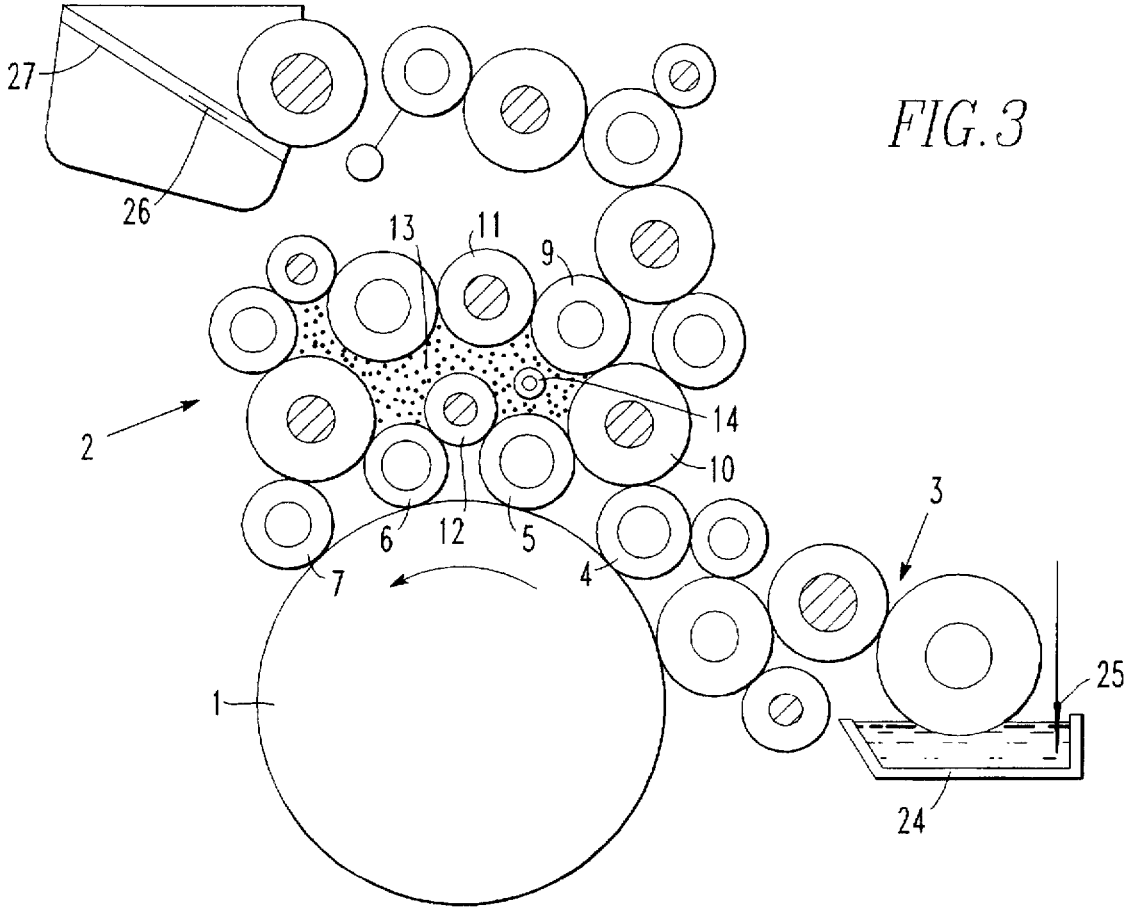
FIG. 3
FIG. 4
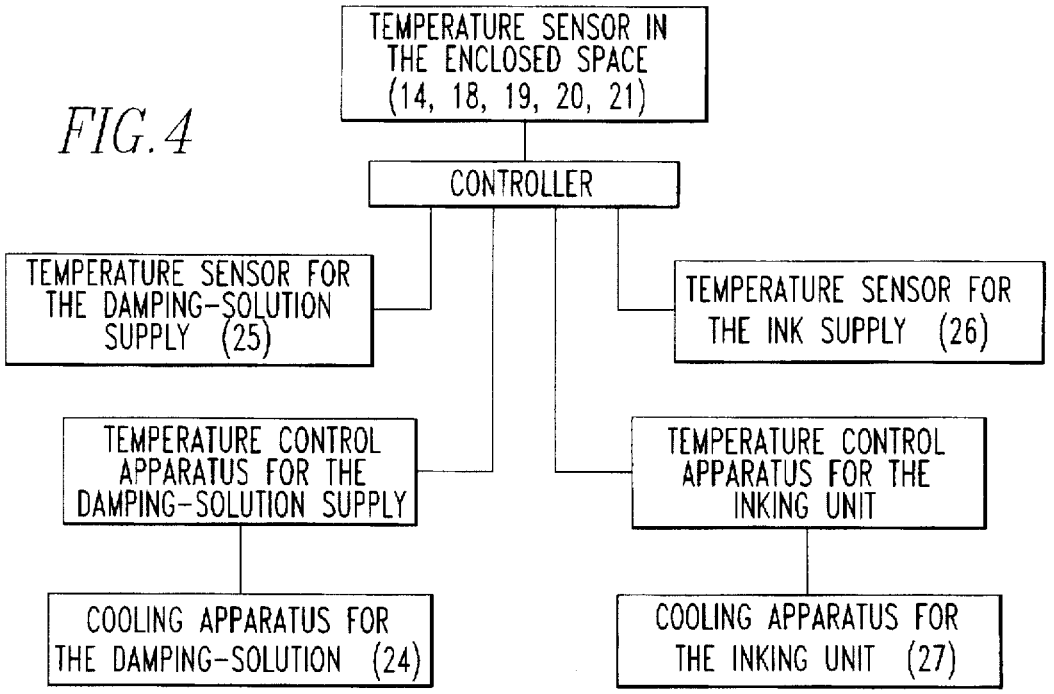

INKING UNIT FOR PRINTING PRESSES

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to an inking unit for printing presses, and preferably offset printing presses. Such printing presses typically can have a plurality of inking rollers for supplying ink to a plurality of plate-inking rollers that ink a plate on a plate cylinder. The inking rollers are generally positioned before the plate-inking rollers and supply the ink to the plate-inking rollers. The inking rollers can also be arranged so that the ink flow provided by the inking rollers is split into two directions of supply. With such a configuration, the inking rollers can, together with the plate-inking rollers, form a closed chain of rollers that enclose a space therebetween.

2. Background Information

In high-speed printing presses, the inking unit can heat up significantly during production printing of a large number of copies. As the inking unit heats up, the viscosity of the ink can be changed as a result of the fluctuations in the temperature. German Patent No. 19 53 590 A1, which corresponds to U.S. Pat. No. 3,741,115, describes an inking unit that is temperature-regulated by means of regulation of the temperature of the damping solution. This German reference utilizes a generally well-known cooling device, which is controlled through the intermediary of a temperature sensor.

In another method of controlling the temperature of an inking unit, disclosed in German Patent No. 27 59 351 C2, apparatus is provided for controlling the temperature of the printing ink. Such a device can be used in order to prevent inking fluctuations in the inking unit of the printing press.

However, the temperature sensors provided in the known apparatuses are generally provided either in the coolant circuit or directly on the ink tank itself. As such, the measured temperature values provided by such known arrangements do not directly indicate the temperature values existing in the inking unit itself. Since the inking unit provides the ink distribution necessary to provide high quality prints, any temperature fluctuations in the unit itself could adversely affect the print quality, unless such changes are quickly identified and remedied. Thus, with the known configurations for controlling temperatures, it is essentially not possible for temperature adjustments, or influences of the temperature control, to be matched precisely to the requirements of the inking unit, as the inking unit temperatures are not measured.

In summary, one aspect of the invention resides broadly in a printing press comprising a plate cylinder, damping apparatus for applying a wetting agent to at least the plate cylinder, the damping apparatus comprising a reservoir for storing the wetting agent, and an inking unit for applying ink to the plate cylinder. The inking unit has an ink reservoir for storing the ink, and the inking unit comprises a plurality of plate-inking rollers disposed in contact with the plate cylinder to apply ink to the plate cylinder, a plurality of inking rollers disposed between the ink reservoir and the plate inking rollers to transfer ink from the ink reservoir to the plate inking rollers. The plurality of inking rollers defines at least two ink supply paths for supplying ink to the plate-inking rollers at at least two locations of the plate-inking rollers, and the inking rollers and the plate-inking rollers form and substantially enclose a space therebetween. The inking unit further comprises a device for extracting air from the substantially enclosed space, a temperature sensor device for measuring a temperature of the extracted air, a device for regulating a temperature of at least one of: the inking unit, and the wetting agent, and control apparatus for receiving the measured temperature from the temperature sensor device and operating the device for regulating based on the measured temperatures of the extracted air.

Another aspect of the invention resides broadly in a method for monitoring and controlling temperature in an inking unit of a printing press, wherein the printing press includes: a plate cylinder; damping apparatus for applying a wetting agent to at least the plate cylinder, and an inking unit for applying ink to the plate cylinder. The inking unit has an ink reservoir for storing the ink, and the inking unit comprises: a plurality of plate-inking rollers disposed in contact with the plate cylinder to apply ink to the plate cylinder; a plurality of inking rollers disposed between the ink reservoir and the plate inking rollers to transfer ink from the ink reservoir to the plate inking rollers; a device for extracting air from an area adjacent the plate-inking rollers and the inking rollers; temperature sensor apparatus for measuring a temperature of the extracted air; a device for regulating a temperature of at least one of: the inking unit, and the wetting agent; and control apparatus for receiving measured temperatures from the temperature sensor device and operating the device for regulating based on the measured temperatures of the extracted air. The method comprises the steps of: transferring ink within the inking unit from the ink reservoir to the plate-inking rollers, the inking unit having a temperature; transferring wetting agent from the wetting agent reservoir to at least the plate cylinder, the wetting agent having a temperature; extracting air from the area adjacent the inking rollers and the plate-inking rollers; measuring a temperature of the extracted air with the temperature sensor device; and adjusting at least one of: the temperature of the inking unit, and the temperature of the wetting agent to bring the measured temperature into correspondence with a predetermined temperature.

A further aspect for the invention resides broadly in an inking unit for a printing press, the printing press having a plate cylinder and damping apparatus for applying a wetting agent to at least the plate cylinder, the damping apparatus comprising a reservoir for storing the wetting agent, and the inking unit for applying ink to the plate cylinder. The inking unit comprises an ink reservoir for storing the ink, a plurality of plate-inking rollers for being disposed in contact with the plate cylinder to apply ink to the plate cylinder; a plurality of inking rollers disposed between the ink reservoir and the plate-inking rollers to transfer ink from the ink reservoir to the plate-inking rollers; the plurality of inking rollers defining at least two ink supply paths for supplying ink to the plate-inking rollers at at least two locations of the plate-inking rollers; the inking rollers and the plate inking rollers forming and substantially enclosing a space therebetween; a device for measuring a temperature of air of the substantially enclosed space; apparatus for regulating a temperature of at least one of: the inking unit, and the wetting agent; and control apparatus for receiving measured temperatures from the temperature sensor device and operating the apparatus for regulating based on the measured temperatures of the extracted air.

OBJECT OF THE INVENTION

The object of the present invention is therefore to improve the printing conditions by improving regulation of the temperature when fluctuations in temperature occur.

SUMMARY OF THE INVENTION

The object of the invention is essentially achieved by providing a means for the extraction of air from the space formed between the inking rollers and the plate-inking rollers, and by routing the extracted air past a temperature sensor to monitor the temperature at the inking unit. The measured values determined by the temperature sensor can then preferably be displayed and/or sent, as measured variables, to a temperature-control apparatus. The temperature control apparatus can be configured to control the temperature of the inking unit and/or the damping-solution supply.

This design according to the present invention makes it possible to perform the continuous measurement of the temperature directly in the inking unit, without the printing process being influenced by the measurement. Furthermore, the measurement is essentially done by contactless means, that is, preferably no parts of the measuring device contact any of the working portions of the inking unit. Thus, the measured values can preferably be used for the continuous temperature control of the inking unit or for regulation of the temperature of the damping-solution supply, without the measurement being distorted by external influences.

According to an advantageous embodiment of the invention, the means for the extraction of the air can preferably be in the form of a tubular cross-member disposed between the side frames of the press. The tubular cross-member can then preferably have, viewed in the length, or axial direction of the rollers, at least one suction opening in the central region thereof. Alternatively, the tubular cross-member could have other configurations of suction openings depending on the desired temperature sensing positions.

A temperature sensor can preferably be provided within the tubular cross-member in the flow direction of the extracted air, so that the extracted air is passed over the sensor to provide a determination of the temperature in the inking unit itself. With such an arrangement, a permanent, small air flow can be extracted from within the inking unit, and thus, by using relatively few devices, there can be essentially optimal adjustment of the inking-unit temperature control and/or of the temperature control of the damping-solution supply to provide an essentially stable temperature in the inking unit.

Alternatively, an inking unit could also be provided with more than one tubular cross-member in the enclosed space. If more than one member was present, the individual cross-members can preferably be placed in a spaced apart configuration to thereby provide a number of temperature readings across the enclosed space. The temperature readings could then preferably be averaged to yield an averaged temperature profile for the respective inking unit, which averaged value could preferably be used to make temperature adjustments. Alternatively, if so desired, instead of averaging values to control a single temperature, individual temperature sensors could supply temperature readings for controlling temperatures in specific locations of the printing press.

In addition, the configuration according to the present invention also provides the advantage that with the continuous volumetric flow of the extracted air out of the inking unit, essentially no heat buildup can be possible at high inking-unit temperatures, as the air within the inking unit can essentially be continuously replaced.

BRIEF DESCRIPTION OF THE DRAWINGS

An advantageous embodiment of the present invention is shown in the accompanying drawings, in which:

FIG. 3 shows an alternative side view of the inking unit with one configuration of temperature control apparatus; and FIG. 4 shows a schematic representation of one possible arrangement of electrical connections for the present invention.

DESCRIPTION OF THE PREFERRED EMBODIMENT

Figure 1:
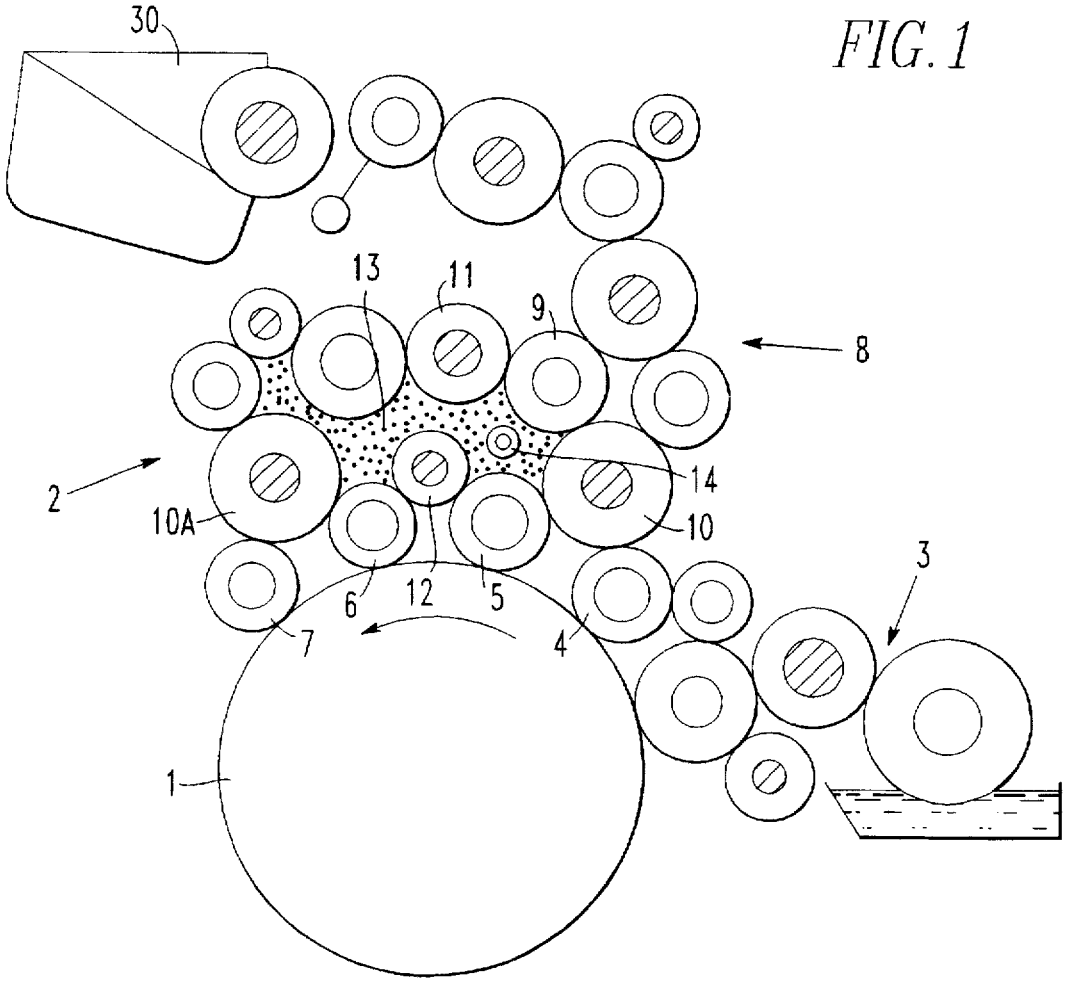
FIG. 1 shows a side view of an inking unit with a tubular cross-member.

In a printing press, the plate cylinder 1, shown in FIG. 1, can typically be arranged in association with an inking unit 2 and a damping unit 3. In the specimen embodiment shown, the inking unit 2 preferably has four plate-inking rollers 4, 5, 6 and 7. The ink can preferably be carried from the ink reservoir 30 to the plate-inking rollers 4–7 by means of a multiplicity of inking rollers generally indicated as 8. In the region of the inking roller 9, the ink flow can preferably be split into preferably at least two directions of supply. In a first direction, the ink can preferably be distributed from the inking roller 10 onto preferably the first two (as viewed in the direction of rotation of the plate cylinder 1) plate-inking rollers 4, 5. In a second direction, the ink can preferably be distributed from the inking roller 11 and the following inking rollers, ending with inking roller 10A, onto the last two (as viewed in the direction of rotation of the plate cylinder 1) plate-inking rollers 6 and 7. As shown in this embodiment, the inking rollers 9, 10, 10A, 11 and any intermediary inking rollers up to the plate-inking roller 6 can form, in conjunction with the plate-inking roller 5 and the intermediate roller 12, a closed chain of rollers, which encloses a space 13.

It should generally be understood that alternative configurations of rollers can also be possible which provide possibly more than one enclosed space, possibly an enclosed space which is defined on one side by the plate cylinder itself, i.e. if rollers 5, 6 and 12 were not present, or possibly no enclosed space if only one ink path were present, i.e., if only rollers 9, 10, 4 and 5 were present. The embodiments as discussed below could generally apply to each of the roller configurations herein referred to.

Figure 2:
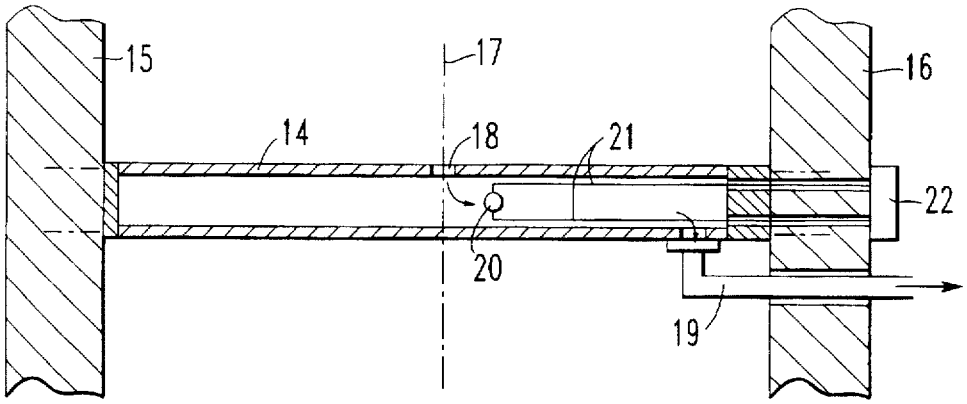
FIG. 2 shows a longitudinal section through the tubular cross-member.

Provided in the space 13 there can preferably be a tubular cross-member 14, which can extend, as shown in FIG. 2, between the two side frames 15, 16. As a variation thereon, the tubular cross-member could also be attached to only one side frame and project a distance away from the side member to preferably about the center 17 of the press. In the shown embodiment, the tubular cross-member 14 can preferably be attached to both printing-press side frames and can preferably have at least one suction opening 18 approximately in the center 17 of the press. An air flow can then preferably be extracted through the suction opening 18 and through the interior of the tubular cross-member 14. The cross-member 14 can preferably be connected to a suction device (not shown) by means of intermediary air tube 19.

Provided in the tubular cross-member 14, in the path of air flow of the extracted air, there can preferably be a sensor 20, which, acting as a temperature sensor, determines measured temperature values. The measured data can then preferably be sent, via lines 21, to a display unit 22. Alternatively, for automatic control of the temperature within the inking unit, the measured data values can preferably be sent to a temperature-control apparatus of the inking unit (see FIG. 4). The suction apparatus and the temperature-control apparatus can essentially be any type of known devices, and have essentially not been shown in the drawing.

As alternative embodiments, if more than one enclosed space were present, individual corresponding temperature sensors could be positioned to read temperatures in each enclosed space, or a cross-member 14 could be disposed within each enclosed space to withdraw air from each enclosed space to either a common temperature sensor 20, or a corresponding temperature sensor 20 for each cross-member 14. On the other hand, if there were no enclosed spaces formed between the rollers, the temperature sensor 20 could be disposed in the vicinity of the inking rollers and plate-inking rollers. In such an embodiment, any tubular member 14 could merely be disposed adjacent the rollers to extract air from the vicinity of the rollers.

As depicted by FIGS. 3 and 4, the measured temperature values can be sent to a control device which can preferably analyze the measured values to determine if a temperature adjustment needs to be made. Upon determining that an adjustment of temperature is needed, the controller can preferably send a signal to the temperature control apparatus 24 of the damping solution supply and/or the temperature control apparatus of the inking unit, which could be a device 27 for cooling the ink stored in the ink reservoir 30. In addition, the controller could also conceivably monitor the temperatures of the damping solution and the ink by means of temperature sensors 26 and 27. By monitoring the temperatures of the damping solution and ink, the controller could determine whether a cooling has been brought about at the desired device, or insure that excessive cooling does not occur at the desired device. Thus, a feedback loop can preferably be established to monitor the temperatures and provide adjustments where necessary.

Further, while the disclosed embodiment of the present invention is discussed as a temperature control, it is conceivable that such a monitoring and adjustment arrangement could also apply to other operating parameters, i.e. air flow for possibly determining whether an air filter is clogged, or humidity, etc. if such parameters have an effect on the overall printing quality.

One feature of the invention resides broadly in the inking unit for printing presses, preferably offset printing presses, with a plurality of plate-inking rollers for inking a plate cylinder and with a multiplicity of inking rollers, said inking rollers being positioned before the plate-inking rollers and supplying the ink to them, with the ink flow being split into two directions of supply and with the inking rollers enclosing a space together with the plate-inking rollers as a closed chain of rollers, characterized in that a means for the extraction of air is provided in the space 13; the extracted air is routed past a temperature sensor 20; and the measured values determined by the temperature sensor 20 are displayable and are sent as controlled variables to the temperature-control apparatus of the inking unit 2 and/or to the damping-solution supply.

Another feature of the invention resides broadly in the inking unit, characterized in that the means for the extraction of air is in the form of a tubular cross-member 14 between the side frames 15, 16, said tubular cross-member 14 comprising, viewed over the length of the rollers, suction openings 18 in the central region 17, and in that a temperature sensor 20 is provided in the tubular cross-member 14 in the flow of the extracted air.

All, or substantially all, of the components and methods of the various embodiments may be used with at least one embodiment or all of the embodiments, if any, described herein.

The invention as described hereinabove in the context of the preferred embodiments is not to be taken as limited to all of the provided details thereof, since modifications and variations thereof may be made without departing from the spirit and scope of the invention.

Reference List

1 Plate cylinder
2 Inking unit
3 Damping unit
4 Plate-inking roller
5 Plate-inking roller
6 Plate inking roller
7 Plate inking roller
8 Inking rollers (general)
9 Inking roller
10 Inking roller
10A Inking roller
11 Inking roller
12 Intermediate roller
13 Space
14 Tubular cross-member
15 Side frame
16 Side frame
17 Center of press
18 Suction openings
19 Air tube
20 Sensor
21 Electrical Lines
22 Display unit
24 Temperature sensor
25 Temperature control device
26 Temperature sensor
27 Temperature control device
30 Ink reservoir

What is claimed is:

[1. A printing press comprising:

a plate cylinder;

damping means for applying a wetting agent to at least the plate cylinder, said damping means comprising a reservoir for storing the wetting agent;

an inking unit for applying ink to the plate cylinder, said inking unit having an ink reservoir for storing the ink, and said inking unit comprising:

a plurality of plate-inking rollers disposed in contact with the plate cylinder to apply ink to the plate cylinder;

a plurality of inking rollers disposed between the ink reservoir and the plate inking rollers to transfer ink from the ink reservoir to the plate inking rollers;

said plurality of inking rollers defining at least two ink supply paths for supplying ink to said plate-inking rollers at at least two locations of said plate-inking rollers;

said inking rollers and said plate-inking rollers forming and substantially enclosing a space therebetween;

means for extracting air from said substantially enclosed space;

temperature sensor means for measuring a temperature of the extracted air;

means for regulating a temperature of at least one of:

the inking unit, and the wetting agent; and control means for receiving said measured temperature from said temperature sensor means and operating said means for regulating based on said measured temperatures of said extracted air.]

[2. The printing press according to claim 1, wherein said means for extracting air comprises a tubular member extending into said substantially enclosed space, said tubular member having at least one opening for extracting air from said substantially enclosed space into said tubular member.]

[3. The printing press according to claim 2, wherein:

said printing press comprises first and second side frames disposed spaced apart from one another and supporting said inking rollers, said plate-inking rollers, and said plate cylinder therebetween;

said printing press has a central portion disposed substantially centrally between said first and second side frames;

said tubular member extends between and is supported by said first and second side frames; and said at least one opening of said tubular member is disposed in substantially said central portion of said printing press.]

[4. The printing press according to claim 2, wherein said temperature sensor means is disposed within said tubular member in a position within said tubular member such that the extracted air passes said temperature sensor means.]

[5. The printing press according to claim 3, wherein said temperature sensor means is disposed within said tubular member in a position within said tubular member such that the extracted air passes said temperature sensor means.]

[6. The printing press according to claim 5, wherein:

said substantially enclosed space is peripherally bordered by adjacent ones of said inking rollers and said plate-inking rollers; and said control means further comprises means for comparing said measured temperatures with a predetermined temperature value, and operating said means for regulating when said measured temperatures differ from said predetermined temperature.]

[7. The printing press according to claim 6, wherein:

said at least two ink supply paths comprise two ink supply paths, and said at least two locations comprise two locations spaced apart from one another along a circumference of the plate cylinder;

said plurality of plate-inking rollers comprises four plate-inking rollers, said four plate inking-rollers comprising two pairs of plate-inking rollers, with one of said two pairs of plate-inking rollers being disposed at each of said two locations;

a first pair of said plate-inking rollers is disposed adjacent a first inking roller, and a second pair of said plate-inking rollers is disposed adjacent a second inking roller;

each roller of said first pair of said plate-inking rollers is disposed in rolling contact with said first inking roller, and each roller of said second pair of said plate-inking rollers is disposed in rolling contact with said second inking roller;

said plurality of inking rollers comprises a first set of inking rollers disposed between said first inking roller and said second inking roller, and a second set of inking rollers disposed between the ink reservoir and said first set of inking rollers;

said damping means comprises at least a first damping roller disposed in rolling engagement with said plate cylinder, a second damping roller disposed in said wetting fluid reservoir, and at least one intermediary roller for transferring the wetting fluid from the second damping roller to the first damping roller; and said means for regulating a temperature comprises means for cooling said inking unit, and means for cooling the wetting agent.]

[8. A method for monitoring and controlling temperature in an inking unit of a printing press, the printing press including: a plate cylinder; a damping means for applying a wetting agent to at least the plate cylinder, an inking unit for applying ink to the plate cylinder, said inking unit having an ink reservoir for storing the ink, and said inking unit comprising: a plurality of plate-inking rollers disposed in contact with the plate cylinder to apply ink to the plate cylinder; a plurality of inking rollers disposed between the ink reservoir and the plate inking rollers to transfer ink from the ink reservoir to the plate inking rollers; means for extracting air from an area adjacent said plate-inking rollers and said inking rollers; temperature sensor means for measuring a temperature of the extracted air; means for regulating a temperature of at least one of: the inking unit, and the wetting agent; and control means for receiving measured temperatures from said temperature sensor means and operating said means for regulating based on said measured temperatures of said extracted air; said method comprising the steps of:

transferring ink within said inking unit from said ink reservoir to said plate-inking rollers, said inking unit having a temperature;

transferring wetting agent from said wetting agent reservoir to at least the plate cylinder, the wetting agent having a temperature;

extracting air from said area adjacent said inking rollers and said plate-inking rollers;

measuring a temperature of said extracted air with said temperature sensor means; and adjusting at least one of:

the temperature of said inking unit, and the temperature of said wetting agent to bring said measured temperature into correspondence with a predetermined temperature.]

[9. The method according to claim 8, wherein said means for extracting air comprises a tubular member extending into said area adjacent said inking rollers and said plate-inking rollers, said tubular member having at least one opening for extracting air from said are adjacent said inking rollers into said tubular member, and said method further comprising:

extracting air through said at least one opening of said tubular member into and through said tubular member.]

[10. The method according to claim 9, wherein said temperature sensor means is disposed within said tubular member in a position within said tubular member such that the extracted air passes over the temperature sensor means, and said method further comprises:

passing said extracted air through said tubular member over said temperature sensor means within said tubular member.]

[11. The method according to claim 10, wherein said printing press comprises first and second side frames disposed spaced apart from one another and supporting said inking rollers, said plate-inking rollers, and said plate cylinder therebetween; said printing press has a central portion disposed substantially centrally between said first and second side frames; said tubular member extends between and is supported by said first and second side frames; said at least one opening of said tubular member is disposed in substantially said central portion of said printing press, and said method further comprises:

extracting air from said area adjacent said inking rollers and said plate-inking rollers through at least said at least one central opening of said tubular member.]

[12. The method according to claim 11, wherein said plurality of inking rollers define at least two ink supply paths for supplying ink to said plate-inking rollers at at least two locations of said plate-inking rollers, said inking rollers and said plate-inking rollers substantially enclosing a space therebetween, said substantially enclosed space comprising said area adjacent said inking rollers and said plate-inking rollers, said substantially enclosed space is peripherally bordered by adjacent ones of said inking rollers and said plate-inking rollers; said means for controlling further comprises means for comparing said measured temperatures with a predetermined temperature value, and operating said means for regulating when said measured temperatures differ from said predetermined temperature; and said method further comprises:

conducting the ink along each of said at least two supply paths to each of said at least two locations of said plate-inking rollers;

extracting air from said substantially enclosed space;

comparing said measured temperatures of the extracted air with the predetermined temperature value; and operating said means for regulating to adjust said at least one of:

the temperature of the inking unit, and the temperature of the wetting agent when said measured temperature differs from said predetermined temperature.]

[13. The method according to claim 12, wherein:

said at least two ink supply paths comprise two ink supply paths, and said at least two locations comprise two locations spaced apart from one another along a circumference of the plate cylinder;

said plurality of plate-inking rollers comprises four plate-inking rollers, said four plate inking-rollers comprising two pairs of plate-inking rollers, with one of said two pairs of plate-inking rollers being disposed at each of said two locations;

a first pair of said plate-inking rollers is disposed adjacent a first inking roller, and a second pair of said plate-inking rollers is disposed adjacent a second inking roller;

each roller of said first pair of said plate-inking rollers is disposed in rolling contact with said first inking roller, and each roller of said second pair of said plate-inking rollers is disposed in rolling contact with said second inking roller;

said plurality of inking rollers comprise a first set of inking rollers disposed between said first inking roller and said second inking roller, and a second set of inking rollers disposed between the ink reservoir and said first set of inking rollers;

said damping means comprises at least a first damping roller disposed in rolling engagement with said plate cylinder, a second damping roller disposed in said wetting fluid reservoir, and at least one intermediary roller for transferring the wetting fluid from the second damping roller to the first damping roller;

said means for regulating a temperature comprises means for cooling said inking unit, and means for cooling the wetting agent; and said method further comprises:

transferring ink from said ink reservoir, along said first set of inking rollers and to said second set of inking rollers;

transferring ink along said second set of inking rollers to each of said first and second inking rollers;

transferring ink from said first and second inking rollers to said first and second pairs of plate-inking rollers;

cooling the ink in said inking unit at at least one of:

in said ink reservoir; and during said ink transferring;

cooling the wetting agent in said wetting agent reservoir.]

14. An inking unit for a printing press, [the printing press having a plate cylinder and damping means for applying a wetting agent to at least the plate cylinder, said damping means comprising a reservoir for storing the wetting agent, said inking unit for applying ink to the plate cylinder,] said inking unit comprising:

*a damping unit to apply a wetting agent;*

*said damping unit comprising a reservoir for storing the wetting agent;* an ink reservoir for storing [the] ink;

a plurality of plate-inking rollers [for being disposed in contact with the plate cylinder] to apply ink [to the plate cylinder];

a plurality of inking rollers disposed between the ink reservoir and the plate-inking rollers to transfer ink from the ink reservoir to said plate-inking rollers;

said plurality of inking rollers defining at least two ink supply paths for supplying ink to said plate-inking rollers at at least two locations of said plate-inking rollers;

said inking rollers and said [plate inking] *plate-inking* rollers forming and substantially enclosing a space therebetween;

[means for measuring] *an arrangement to measure a temperature of air, said temperature measuring arrangement being disposed to measure* a temperature of air of said substantially enclosed space;

[means for regulating] *an apparatus to regulate* a temperature of at least one of:

the inking unit, and the wetting agent; and

*a* control [means for receiving] *device connected to receive* measured temperatures from said [means for measuring] temperature *measuring arrangement* and [operating said means for regulating] *connected to operate said temperature regulating apparatus* based on said measured temperatures of the air of said substantially enclosed space.

15. The inking unit according to claim 14, wherein:

said substantially enclosed space is peripherally bordered by adjacent ones of said inking rollers and said plate-inking rollers; and said [means for controlling] *control device* further comprises [means for comparing] *an arrangement to compare* said measured temperatures with a predetermined temperature value, and [operating] *to operate* said [means for regulating] *temperature regulating apparatus* when said measured temperatures differ from said predetermined temperature.

16. The inking unit according to claim 14, wherein:

said [means for measuring a] temperature [of air of said substantially enclosed space] *measuring arrangement* further comprises [means for extracting] *a device to extract* air from said substantially enclosed space, said [means for] *air* extracting *device* further comprising:

a tubular member extending into said substantially enclosed space, said tubular member having at least one opening [for extracting] *disposed to extract* air from said substantially enclosed space into said tubular member.

17. The inking unit according to claim 16, wherein said [means for measuring a] temperature [of air of said substantially enclosed space] *measuring arrangement* further comprises a temperature sensing device disposed within said tubular member in a position within said tubular member such that the extracted air passes over the temperature sensing device.

18. The inking unit according to claim 16, wherein:

[the printing press further comprises first and second side frames disposed spaced apart from one another and supporting] *each of* said inking rollers [,] *and* said plate-inking rollers [, and said plate cylinder therebetween, said printing press has] *comprises a first end, a second end, and* a central portion disposed substantially centrally between said first and second [side frames] *ends, each of said first ends is disposed axially from each of said respective second ends*;

said tubular member [extends] *is disposed to extend from adjacent* [between and is supported by] said first [and] *ends to adjacent said* second [side frames] *ends of said inking rollers and plate-inking rollers*; and said at least one opening of said tubular member is disposed [in] substantially *adjacent* said central [portion of said printing press] *portions of said inking rollers and said plate-inking rollers.*

19. The inking unit according to claim 18, wherein said [means for measuring] temperature [is] *measuring arrangement comprises a temperature sensing device* disposed within said tubular member in a position within said tubular member such that said [means for measuring] temperature *sensing device* is passed over by the extracted air as the extracted air flows along the tubular member.

20. The inking unit according to claim 19, wherein:

said at least two ink supply paths comprise two ink supply paths, and said at least two locations comprise two locations spaced apart from one another [along a circumference of the plate cylinder];

said plurality of plate-inking rollers comprises four plate-inking rollers, said four plate inking-rollers comprising two pairs of plate-inking rollers, with one of said two pairs of plate-inking rollers being disposed at each of said two locations;

a first pair of said plate-inking rollers is disposed adjacent a first inking roller, and a second pair of said plate-inking rollers is disposed adjacent a second inking roller;

each roller of said first pair of said plate-inking rollers is disposed in rolling contact with said first inking roller, and each roller of said second pair of said plate-inking rollers is disposed in rolling contact with said second inking roller;

said plurality of inking rollers comprises a first set of inking rollers disposed between said first inking roller and said second inking roller, and a second set of inking rollers disposed between the ink reservoir and said first [portion] *set* of inking rollers;

said damping [means] *unit* comprises at least a first damping roller [disposed in rolling engagement with said plate cylinder], a second damping roller disposed in said wetting [fluid] *agent* reservoir, and at least one intermediary roller for transferring the wetting [fluid] *agent* from the second damping roller to the first damping roller; and said [means for regulating a] temperature *regulating apparatus* comprises [means for cooling] *an arrangement to cool* said inking unit, and [means for cooling] *an arrangement to cool* the wetting agent.

*21. An inking unit for a printing press, in combination with a printing press, the printing press comprising:*

*a plate cylinder; and*

*a damping unit to apply a wetting agent to at least said plate cylinder, said damping unit comprising a reservoir for storing the wetting agent;*

*said inking unit to apply ink to said plate cylinder, said inking unit comprising:*

*an ink reservoir for storing the ink;*

*a plurality of plate-inking rollers to be disposed in contact with said plate cylinder to apply ink to said plate cylinder;*

*a plurality of inking rollers disposed between said ink reservoir and said plate-inking rollers to transfer ink from said ink reservoir to said plate-inking rollers;*

*said plurality of inking rollers defining at least two ink supply paths to supply ink to said plate-inking rollers at at least two locations of said plate-inking rollers;* said inking rollers and said plate-inking rollers forming and substantially enclosing a space therebetween;

*an arrangement to measure a temperature of air, said air temperature measuring arrangement being disposed to measure a temperature of air of said substantially enclosed space;*

*an apparatus to regulate a temperature of at least one of:*

*said inking unit, and*

*a wetting agent; and*

*a control device connected to receive the measured temperature from said temperature measuring arrangement and connected to operate said temperature regulating apparatus based on the measured temperature of the air of said substantially enclosed space.*

*22. The inking unit according to claim 21, wherein:*

*said substantially enclosed space is peripherally bordered by adjacent ones of said inking rollers and said plate-inking rollers; and*

*said control device further comprises an arrangement to compare said measured temperature with a predetermined temperature value and to operate said temperature regulating apparatus when said measured temperature differs from said predetermined temperature.*

*23. The inking unit according to claim 21, wherein:*

*said temperature measuring arrangement comprises a device to extract air from said substantially enclosed space, said air extracting device comprises:*

*a tubular member extending into said substantially enclosed space, said tubular member having at least one opening disposed to extract air from said substantially enclosed space into said tubular member.*

*24. The inking unit according to claim 23, wherein said temperature measuring arrangement further comprises a temperature sensing device disposed within said tubular member in a position within said tubular member such that the extracted air passes over said temperature sensing device.*

*25. The inking unit according to claim 23, wherein:*

*the printing press further comprises first and second side frames disposed spaced apart from one another and supporting said inking rollers, said plate-inking rollers, and said plate cylinder therebetween, said printing press has a central portion disposed substantially centrally between said first and second side frames;*

*said tubular member extends between and is supported by said first and second side frames; and*

*said at least one opening of said tubular member is disposed in substantially said central portion of said printing press.*

*26. The inking unit according to claim 25, wherein said temperature measuring arrangement further comprises a temperature sensing device disposed within said tubular member in a position within said tubular member such that the extracted air passes over said temperature sensing device.*

*27. The inking unit according to claim 26, wherein:*

*said at least two ink supply paths comprise two ink supply paths, and said at least two locations comprise two locations spaced apart from one another along a circumference of said plate cylinder;*

*said plurality of plate-inking rollers comprises four plate-inking rollers, said four plate-inking rollers comprising two pairs of plate-inking rollers, with one of said two pairs of plate-inking rollers being disposed at each of said two locations;*

*a first pair of said plate-inking rollers is disposed adjacent a first inking roller, and a second pair of said plate-inking rollers is disposed adjacent a second inking roller;*

*each roller of said first pair of said plate-inking rollers is disposed in rolling contact with said first inking roller, and each roller of said second pair of said plate-inking rollers is disposed in rolling contact with said second inking roller;*

*said plurality of inking rollers comprises a first set of inking rollers disposed between said first inking roller and said second inking roller, and a second set of inking rollers disposed between said ink reservoir and said first set of inking rollers; and*

*said damping unit comprises at least a first damping roller disposed in rolling engagement with said plate cylinder, a second damping roller disposed in said wetting agent reservoir, and at least one intermediary roller disposed to transfer the wetting agent from said second damping roller to said at least a first damping roller; and*

*said temperature regulating apparatus comprises an arrangement to cool said inking unit and an arrangement to cool the wetting agent.*

*28. A printing press comprising:*

*a plate cylinder;*

*a damping unit to apply a wetting agent to at least said plate cylinder, said damping unit comprising a reservoir for storing the wetting agent;*

*an inking unit for applying ink to said plate cylinder, said inking unit having an ink reservoir for storing the ink, and said inking unit comprising:*

*a plurality of plate-inking rollers disposed in contact with said plate cylinder to apply ink to said plate cylinder;*

*a plurality of inking rollers disposed between said ink reservoir and said plate-inking rollers to transfer ink from said ink reservoir to said plate-inking rollers;*

*said plurality of inking rollers defining at least two ink supply paths for supplying ink to said plate-inking rollers at at least two locations of said plate-inking rollers;*

*said inking rollers and said plate-inking rollers forming and substantially enclosing a space therebetween;*

*a device to extract air being disposed to extract air from said substantially enclosed space;*

*a temperature sensor being disposed to measure a temperature of the extracted air;*

*an apparatus to regulate a temperature of at least one of: the inking unit, and the wetting agent; and*

*a control device connected to receive said measured temperature from said temperature sensor and connected to operate said temperature regulating apparatus based on said measured temperature of said extracted air.*

*29. The printing press according to claim 28, wherein said device to extract air comprises a tubular member extending into said substantially enclosed space, said tubular member having at least one opening disposed to extract air from said substantially enclosed space into said tubular member.*

*30. The printing press according to claim 29, wherein:*

*said printing press comprises first and second side frames disposed spaced apart from one another and supporting said inking rollers, said plate-inking rollers, and said plate cylinder therebetween;*

*said printing press has a central portion disposed substantially centrally between said first and second side frames;*

*said tubular member extends between and is supported by said first and second side frames; and*

*said at least one opening of said tubular member is disposed in substantially said central portion of said printing press.*

*31. The printing press according to claim 29, wherein said temperature sensor is disposed within said tubular member in a position within said tubular member such that the extracted air passes over said temperature sensor.*

*32. The printing press according to claim 30, wherein said temperature sensor is disposed within said tubular member in a position within said tubular member such that the extracted air passes over said temperature sensor.*

*33. The printing press according to claim 32, wherein:*

*said substantially enclosed space is peripherally bordered by adjacent ones of said inking rollers and said plate-inking rollers; and*

*said control device further comprises an arrangement to compare said measured temperature with a predetermined temperature value and to operate said temperature regulating apparatus when said measured temperature differs from said predetermined temperature.*

*34. The printing press according to claim 33, wherein:*

*said at least two ink supply paths comprise two ink supply paths, and said at least two locations comprise two locations spaced apart from one another along a circumference of said plate cylinder;*

*said plurality of plate-inking rollers comprise four plate-inking rollers, said four plate-inking rollers comprising two pairs of plate-inking rollers, with one of said two pairs of plate-inking rollers being disposed at each of said two locations;*

*a first pair of said plate-inking rollers is disposed adjacent a first inking roller, and a second pair of said plate-inking rollers is disposed adjacent a second inking roller;*

*each roller of said first pair of said plate-inking rollers is disposed in rolling contact with said first inking roller, and each roller of said second pair of said plate-inking rollers is disposed in rolling contact with said second inking roller;*

*said plurality of inking rollers comprises a first set of inking rollers disposed between said first inking roller and said second inking roller, and a second set of inking rollers disposed between said ink reservoir and said first set of inking rollers;*

*said damping unit comprises at least a first damping roller disposed in rolling engagement with said plate cylinder, a second damping roller disposed in said wetting agent reservoir, and at least one intermediary roller disposed to transfer the wetting agent from said second damping roller to said at least a first damping roller; and*

*said temperature regulating apparatus comprises an arrangement to cool said inking unit and an arrangement to cool the wetting agent.*

*35. A method for monitoring and controlling temperature in an inking unit of a printing press, the printing press including: a plate cylinder; a damping unit to apply a wetting agent to at least the plate cylinder, the damping unit comprising a reservoir for storing the wetting agent; an inking unit to apply ink to the plate cylinder, said inking unit having an ink reservoir for storing the ink, and said inking unit comprising: a plurality of plate-inking rollers disposed in contact with the plate cylinder to apply ink to the plate cylinder; a plurality of inking rollers disposed between the ink reservoir and the plate-inking rollers to transfer ink from the ink reservoir to the plate-inking rollers; said plurality of inking rollers defining at least two ink supply paths for supplying ink to said plate-inking rollers at at least two locations of said plate inking rollers; said inking rollers and said plate-inking rollers forming and substantially enclosing a space therebetween; a device to extract air being disposed to extract air from said substantially enclosed space; a temperature sensor being disposed to measure a temperature of the extracted air; an apparatus to regulate a temperature of at least one of: the inking unit, and the wetting agent; and a control device connected to receive said measured temperature from said temperature sensor and connected to operate said temperature regulating apparatus based on said measured temperature of said extracted air; said method comprising the steps of:*

*transferring ink within said inking unit from said ink reservoir to said plate-inking rollers, said inking unit having a temperature;*

*transferring wetting agent from said wetting agent reservoir to at least the plate cylinder, the wetting agent having a temperature;*

*extracting air from said substantially enclosed space;*

*measuring a temperature of said extracted air with said temperature sensor; and*

*regulating at least one of:*

*the temperature of said inking unit, and*

*the temperature of said wetting agent to bring said measured temperature into correspondence with a predetermined temperature.*

*36. The method according to claim 35, wherein said device to extract air comprises a tubular member extending into said substantially enclosed space, said tubular member having at least one opening disposed to extract air from said substantially enclosed space, and said method further comprises:*

*extracting air through said at least one opening of said tubular member into and through said tubular member.*

*37. The method according to claim 36, wherein said temperature sensor is disposed within said tubular member in a position within said tubular member such that the extracted air passes over the temperature sensor, and said method further comprises:*

*passing said extracted air through said tubular member over said temperature sensor within said tubular member.*

*38. The method according to claim 37, wherein said printing press comprises first and second side frames disposed spaced apart from one another and supporting said inking rollers, said plate-inking rollers, and said plate cylinder therebetween; said printing press has a central portion disposed substantially centrally between said first and second side frames; said tubular member extends between and is supported by said first and second side frames; said at least one opening of said tubular member is disposed in substantially said central portion of said printing press, and said method further comprises:*

*extracting air from said substantially enclosed space through at least said at least one central opening of said tubular member.*

*39. The method according to claim 38, wherein said substantially enclosed space is peripherally bordered by adjacent ones of said inking rollers and said plate-inking rollers; said control device further comprises an arrangement to compare said measured temperature with a predetermined temperature value and to operate said temperature regulating apparatus when said measured temperature differs from said predetermined temperature; and said method further comprises:*

*comparing said measured temperature of the extracted air with the predetermined temperature value; and*

*operating said temperature regulating apparatus to regulate said at least one of:*

*the temperature of the inking unit, and*

*the temperature of the wetting agent when said measured temperature differs from said predetermined temperature.*

*40. The method according to claim 39, wherein:*

*said at least two ink supply paths comprise two ink supply paths, and said at least two locations comprise two locations spaced apart from one another along a circumference of the plate cylinder;*

*said plurality of plate-inking rollers comprise four plate-inking rollers, said four plate-inking rollers comprising two pairs of plate-inking rollers, with one of said two pairs of plate-inking rollers being disposed at each of said two locations;*

*a first pair of said plate-inking rollers is disposed adjacent a first inking roller, and a second pair of said plate-inking rollers is disposed adjacent a second inking roller;*

*each roller of said first pair of said plate-inking rollers is disposed in rolling contact with said first inking roller, and each roller of said second pair of said plate-inking rollers is disposed in rolling contact with said second inking roller;*

*said plurality of inking rollers comprise a first set of inking rollers disposed between said first inking roller and said second inking roller, and a second set of inking rollers disposed between the ink reservoir and said first set of inking rollers;*

*said damping unit comprises at least a first damping roller disposed in rolling engagement with said plate cylinder, a second damping roller disposed in said wetting agent reservoir, and at least one intermediary roller disposed to transfer the wetting agent from the second damping roller to the first damping roller;*

*said temperature regulating apparatus comprises an arrangement to cool said inking unit, and an arrangement to cool the wetting agent; and*

*said method further comprises:*

*transferring ink from said ink reservoir, along said first set of inking rollers and to said second set of inking rollers;*

*transferring ink along said second set of inking rollers to each of said first and second inking rollers;*

*transferring ink from said first and second inking rollers to said first and second pairs of plate-inking rollers;*

*cooling the ink in said inking unit at at least one of:*

*in said ink reservoir; and*

*during said ink transferring; and*

*cooling the wetting agent in said wetting agent reservoir.*

* * * * *